US011288346B1

(12) United States Patent
Zubovsky et al.

(10) Patent No.: US 11,288,346 B1
(45) Date of Patent: Mar. 29, 2022

(54) SYSTEM AND METHOD FOR AUTHENTICATING USERS USING WEAK AUTHENTICATION TECHNIQUES, WITH DIFFERENCES FOR DIFFERENT FEATURES

(71) Applicant: Charles Schwab & Co., Inc., San Francisco, CA (US)

(72) Inventors: Valery Zubovsky, San Francisco, CA (US); Charles E. Gotlieb, San Francisco, CA (US)

(73) Assignee: Charles Schwab & Co., Inc., Southlake, TX (US)

( * ) Notice: Subject to any disclaimer, the term of this patent is extended or adjusted under 35 U.S.C. 154(b) by 96 days.

(21) Appl. No.: 14/637,053

(22) Filed: Mar. 3, 2015

Related U.S. Application Data

(60) Provisional application No. 61/947,066, filed on Mar. 3, 2014.

(51) Int. Cl.
  *G06F 21/34* (2013.01)
  *G06F 21/31* (2013.01)
  *G06F 21/46* (2013.01)

(52) U.S. Cl.
  CPC .............. *G06F 21/31* (2013.01); *G06F 21/46* (2013.01)

(58) Field of Classification Search
  CPC ... G06F 21/31; G06F 21/46; G06F 2221/2113
  USPC .......................................................... 726/2, 7
  See application file for complete search history.

(56) References Cited

U.S. PATENT DOCUMENTS

| 6,591,224 | B1 * | 7/2003 | Sullivan ................... G06K 9/00 702/108 |
| 6,928,558 | B1 * | 8/2005 | Allahwerdi ............. G06F 21/31 713/172 |
| 7,086,085 | B1 * | 8/2006 | Brown ................ G06F 21/6218 714/E11.207 |
| 7,187,771 | B1 * | 3/2007 | Dickinson ............... G06F 21/31 380/228 |
| 8,131,786 | B1 * | 3/2012 | Bengio ............. G06F 17/30244 707/732 |
| 8,424,072 | B2 * | 4/2013 | Pullikottil ........... H04L 63/1425 380/232 |
| 8,494,961 | B1 * | 7/2013 | Lucas ................ G06Q 20/1085 705/35 |

(Continued)

FOREIGN PATENT DOCUMENTS

| CA | 2501899 C | * | 6/2010 | .......... A61B 5/4809 |
| CA | 2727831 C | * | 2/2019 | ............. G06Q 40/02 |

(Continued)

OTHER PUBLICATIONS

Hayashi, "CASA: Context-Aware Scalable Authentication", Symposium on Usable Privacy and Security (SOUPS) 2013, Jul. 24-26, 2013, Newcastle, UK, 10 pages.*

(Continued)

*Primary Examiner* — Luu T Pham
*Assistant Examiner* — Walter J Malinowski
(74) *Attorney, Agent, or Firm* — Innovation Partners LLC; Charles E. Gotlieb

(57) ABSTRACT

A system and method uses different authentication techniques, including weak passive authentication techniques, to authenticate users by generating a score and comparing it to a threshold selected according to the feature the user is requesting.

15 Claims, 3 Drawing Sheets

(56) References Cited

U.S. PATENT DOCUMENTS

| | | | | |
|---|---|---|---|---|
| 8,539,567 B1* | 9/2013 | Logue | | H04L 63/0884 |
| | | | | 709/223 |
| 8,719,911 B2* | 5/2014 | Novack | | H04L 9/3231 |
| | | | | 726/7 |
| 9,262,642 B1* | 2/2016 | Roth | | G06F 21/62 |
| 9,647,999 B2* | 5/2017 | Grigg | | H04L 63/105 |
| 9,722,996 B1* | 8/2017 | Koi | | H04L 63/083 |
| 10,032,008 B2* | 7/2018 | Griffiths | | G06F 21/305 |
| 10,140,597 B2* | 11/2018 | Benton | | G06K 9/036 |
| 10,657,521 B2* | 5/2020 | Tomasofsky | | G06Q 20/407 |
| 10,706,132 B2* | 7/2020 | Lindemann | | G06Q 20/40145 |
| 2003/0154406 A1* | 8/2003 | Honarvar | | G06Q 10/10 |
| | | | | 726/10 |
| 2005/0036615 A1* | 2/2005 | Jakobsson | | H04L 9/3234 |
| | | | | 380/255 |
| 2005/0149763 A1* | 7/2005 | Nakao | | G06F 21/31 |
| | | | | 726/19 |
| 2005/0235341 A1* | 10/2005 | Stieglitz | | G06F 21/46 |
| | | | | 726/5 |
| 2006/0074986 A1* | 4/2006 | Mallalieu | | G07C 9/00087 |
| 2007/0050850 A1* | 3/2007 | Katoh | | G06F 21/31 |
| | | | | 726/27 |
| 2007/0056025 A1* | 3/2007 | Sachdeva | | H04L 63/0823 |
| | | | | 726/5 |
| 2007/0076924 A1* | 4/2007 | Fujii | | G06K 9/00013 |
| | | | | 382/124 |
| 2007/0112944 A1* | 5/2007 | Zapata | | G06F 8/65 |
| | | | | 709/221 |
| 2007/0124805 A1* | 5/2007 | Zhou | | H04L 63/105 |
| | | | | 726/5 |
| 2007/0224999 A1* | 9/2007 | Ritter | | H04W 4/16 |
| | | | | 455/445 |
| 2007/0283416 A1* | 12/2007 | Renaud | | G06F 21/31 |
| | | | | 726/2 |
| 2008/0137861 A1* | 6/2008 | Lindmo | | G06F 21/31 |
| | | | | 380/270 |
| 2008/0222706 A1* | 9/2008 | Renaud | | H04L 63/1408 |
| | | | | 726/4 |
| 2009/0037515 A1* | 2/2009 | Zapata | | H04L 43/0811 |
| | | | | 709/202 |
| 2009/0132710 A1* | 5/2009 | Pelley | | G06Q 10/063 |
| | | | | 709/226 |
| 2009/0158425 A1* | 6/2009 | Chan | | G06F 21/60 |
| | | | | 726/21 |
| 2009/0287930 A1* | 11/2009 | Nagaraja | | H04L 9/08 |
| | | | | 713/171 |
| 2010/0169957 A1* | 7/2010 | Zurko | | G06F 21/31 |
| | | | | 726/5 |
| 2010/0192209 A1* | 7/2010 | Steeves | | G06F 21/316 |
| | | | | 726/7 |
| 2010/0199218 A1* | 8/2010 | Farrelly | | G06N 20/00 |
| | | | | 715/820 |
| 2011/0099602 A1* | 4/2011 | Apparao | | G06Q 10/06 |
| | | | | 726/1 |
| 2011/0202989 A1* | 8/2011 | Otranen | | H04L 63/0815 |
| | | | | 726/8 |
| 2011/0225429 A1* | 9/2011 | Papamanthou | | G06F 21/64 |
| | | | | 713/189 |
| 2012/0011222 A1* | 1/2012 | Yasukawa | | H04L 67/16 |
| | | | | 709/217 |
| 2012/0020060 A1* | 1/2012 | Myer | | F21S 2/00 |
| | | | | 362/183 |
| 2012/0159590 A1* | 6/2012 | Novack | | H04L 9/3231 |
| | | | | 726/7 |
| 2012/0204257 A1* | 8/2012 | O'Connell | | G06Q 30/06 |
| | | | | 726/19 |
| 2012/0284783 A1* | 11/2012 | Jakobsson | | G06F 21/46 |
| | | | | 726/6 |
| 2013/0019290 A1* | 1/2013 | Lee | | G06F 21/46 |
| | | | | 726/6 |
| 2013/0055348 A1* | 2/2013 | Strauss | | G06F 21/31 |
| | | | | 726/3 |
| 2013/0067547 A1* | 3/2013 | Thavasi | | G06F 21/32 |
| | | | | 726/7 |
| 2013/0152044 A1* | 6/2013 | Salecker | | G06F 8/70 |
| | | | | 717/120 |
| 2013/0222840 A1* | 8/2013 | Hosoda | | H04N 1/00204 |
| | | | | 358/1.14 |
| 2014/0038557 A1* | 2/2014 | Kim | | H04W 12/06 |
| | | | | 455/411 |
| 2014/0143149 A1* | 5/2014 | Aissi | | G06F 21/31 |
| | | | | 705/44 |
| 2014/0173591 A1* | 6/2014 | Lin | | G06F 9/45533 |
| | | | | 718/1 |
| 2014/0181911 A1* | 6/2014 | Kula | | H04L 63/0853 |
| | | | | 726/4 |
| 2014/0189807 A1* | 7/2014 | Cahill | | G06F 21/41 |
| | | | | 726/4 |
| 2014/0189829 A1* | 7/2014 | McLachlan | | H04L 63/08 |
| | | | | 726/6 |
| 2015/0019478 A1* | 1/2015 | Buehne | | G06F 17/30079 |
| | | | | 707/609 |
| 2015/0081295 A1* | 3/2015 | Yun | | G10L 17/005 |
| | | | | 704/236 |
| 2015/0128236 A1* | 5/2015 | Moscicki | | H04L 63/0876 |
| | | | | 726/7 |
| 2015/0227729 A1* | 8/2015 | Grigg | | G06F 21/31 |
| | | | | 726/7 |
| 2015/0242605 A1* | 8/2015 | Du | | G06F 21/32 |
| | | | | 726/7 |
| 2015/0363582 A1* | 12/2015 | Sheller | | G06F 21/31 |
| | | | | 726/17 |
| 2016/0063471 A1* | 3/2016 | Kobres | | G06F 21/316 |
| | | | | 705/18 |
| 2016/0285911 A1* | 9/2016 | Goldman | | G06F 21/31 |

FOREIGN PATENT DOCUMENTS

| | | | | | |
|---|---|---|---|---|---|
| CN | 1808969 A | * | 7/2006 | | G09C 5/00 |
| CN | 101917270 A | * | 12/2010 | | |
| CN | 101083586 B | * | 5/2012 | | G06F 9/54 |
| JP | 2003524476 A | * | 8/2003 | | |
| JP | 2004294916 A | * | 10/2004 | | |
| JP | 3647885 B2 | * | 5/2005 | | G06K 9/00087 |
| JP | 3780830 B2 | * | 5/2006 | | G06K 9/00026 |

OTHER PUBLICATIONS

Ozturk, "Towards Robust Low Cost Authentication for Pervasive Devices", Sixth Annual IEEE International Conference on Pervasive Computing and Communications, 2008, IEEE, pp. 170-178.*

Azmi, "Adaptive Authentication: Issues and Challenges", IEEE, 2013, 6 pages.*

Chairunnanda, "Privacy: Gone with the Typing! Identifying Web Users by Their Typing Patterns", 2011 IEEE International Conference on Privacy, Security Risk, and Trust, and IEEE International Conference on Social Computing, IEEE,. 2011, p. 974-980.*

Carullo, "FeelTrust: Providing Trustworthy Communications in Ubiquitous Mobile Environment", 2013 IEEE 27th International Conference on Advanced Information Networking and Applications, 2013, pp. 1113-1120. (Year: 2013).*

Eremin, "A Concept of Continuous User Authentication Based on Behavioral Biometrics", Proceeding of the 20th Conference of FRUCT Association, 2017, 7 pages. (Year: 2017).*

Zhu, "SenSec: Mobile Security through Passive Sensing", 2013 International Conference on Computing, Networking and Communications (ICNC), 2013, pp. 1128-1133. (Year: 2013).*

Xiong, Huijun, Xinwen Zhang, Danfeng Yao, Xiaoxin Wu, and Yonggang Wen. "Towards end-to-end secure content storage and delivery with public cloud." In Proceedings of the second ACM conference on Data and Application Security and Privacy, pp. 257-266. 2012. (Year: 2012).*

Zhu, Jiang, Pang Wu, Xiao Wang, and Joy Zhang. "Sensec: Mobile security through passive sensing." In 2013 International Conference on Computing, Networking and Communications (ICNC), pp. 1128-1133. IEEE, 2013. (Year: 2013).*

(56) References Cited

OTHER PUBLICATIONS

Microsoft Computer Dictionary definition of feature.*
American Heritage Dictionary defintion of inconvenient.*

* cited by examiner

SYSTEM AND METHOD FOR AUTHENTICATING USERS USING WEAK AUTHENTICATION TECHNIQUES, WITH DIFFERENCES FOR DIFFERENT FEATURES

RELATED APPLICATION

This application claims the benefit of U.S. Provisional Patent Application Ser. No. 61/947,066 entitled, "Method and Apparatus for Authenticating Users Using Weak Authentication Techniques, With Differences For Different Features" filed on Mar. 3, 2014 by Valery Zubovsky and Charles Gotlieb, having the same assignee as the present invention and is hereby incorporated by reference in its entirety.

FIELD OF THE INVENTION

The present invention is related to computer software and hardware and more specifically to computer software and hardware for authentication of users.

BACKGROUND OF THE INVENTION

Current methods of authenticating users are suboptimal. What is needed is a system and method for improved authentication of users.

SUMMARY OF INVENTION

A system and method receives any or all of: different weights, and/or different formulas for computing an authentication score and/or different thresholds for identifying whether a user is considered to be authenticated, for each of several features or types of features that can be provided to users. The weights, formulas or thresholds may be provided for each combination of a) feature or feature type and b) each of several types of devices. The weights, formulas or thresholds may be provided for all features or feature types, and optionally devices. For example, a different set of weights may be assigned to each feature or feature type and a single threshold may be used for all feature types, or vice versa.

When the user requests a feature, the component scores from one or more methods of authenticating a user, some or all of which are not considered to be strong authentication methods, will be multiplied by the weights for the feature or feature type corresponding to the feature, and optionally the device, to produce an authentication score; or component scores from such one or more authentication methods are applied to the formula for authenticating the user for that feature or feature type, and optionally device, or one such formula or set of weights is applied for all features or all features and all devices. The threshold or different thresholds for the feature or type of feature requested, and optionally the device, or for all features, is used to identify whether the feature should be provided to the user. If the authentication score exceeds the threshold, the feature is provided to the user and otherwise, the feature may not be provided to the user. If types of features are used, an assignment of each feature to its type is also received.

When the user requests a feature, for example, a feature of a website, in one embodiment, an authentication score is computed for the user at first using passive methods of authentication, those that do not require the user to do anything for the sole purpose of authenticating that user. Each of one or more passive techniques of authentication is assigned a component score based on how well the passive indications corresponding to the technique indicate that the user is who he or she appears to be. For example, if the user is using a computer system that was used by that user to authenticate himself or herself previously at least to the threshold score corresponding to the feature requested, a computer system fingerprinting score based on the similarity of components of the computer system with those previously recorded for that user when the user was authenticated to at least a threshold level for the feature requested will be higher than the component score that results if the user had not used a computer system with the same components to so authenticate himself or herself recently, and that component score will be higher than if the user has never used the computer before. Each of one or more component scores from one or more passive authentication techniques is used to produce the authentication score, either by multiplying the component score or scores by the applicable weight for the feature or feature type, and optionally the device, or by using the component score or scores in the applicable formula for the feature or feature type, and optionally the device and comparing it to the applicable threshold.

If the authentication score meets or exceeds the applicable threshold, the feature is provided to the user. Otherwise, active methods of authentication are requested from the user, such as the user speaking a phrase, returning a series of characters provided via a communication method different from the one over which the characters were provided, or using other conventional methods of active authentication, those which the user is requested to take an action for the primary purpose of authenticating the user. In one embodiment, various methods of active authentication may be available to authenticate a user, and one or more such methods are selected so that when the authentication score is recomputed including both the passive and active authentication score components, weighted and summed according to the applicable weights for the feature or feature type, or used to compute the authentication score using the applicable formula for the feature or feature type, the user's authentication score can, or is expected to, exceed the threshold.

In one embodiment, the available active authentication techniques are selected using an inconvenience score assigned to each technique that estimates the inconvenience to the user of authenticating himself or herself using that method of authentication, so as to minimize the inconvenience to the user. In one embodiment, a possible or an estimated score component for each active authentication technique is used, either instead of, or in addition to, the inconvenience score, to select the one or more methods of active authentication to request from the user. A possible score is the highest score or a percentage of the highest score reasonably expected if the authentication technique succeeds at least at a moderately high level. Such estimated scores are either recent average component scores for the authentication techniques that the user has recently generated when the techniques were attempted by the user in the past. If insufficient data is available for such user, optionally on the same type of device, for a given active authentication technique, the average component score achieved by the use of the technique for all users, optionally on the same type of device, may be used instead. The selection of the active authentication technique is performed by selecting the active authentication techniques that are estimated to, when weighted with the applicable weights or used in the applicable formula, cause the user's total authentication score from all forms of authentication to exceed the threshold applicable to the requested feature, optionally while minimizing the total inconvenience to the user. In one embodiment, multiple forms of active authentication produce an inconvenience score that is greater than the sum of the inconvenience scores for each authentication, so that fewer active authentication techniques are favored.

In one embodiment, requesting a user to provide a password has a higher inconvenience score than at least one or more other active authentication techniques, so that requesting a password may be least favored or used as a last resort.

In another embodiment, passwords are not used in computing the authentication score, only other authentication techniques are used. Such techniques may be referred to as "sinepassword" authentications. In another embodiment, binary forms of authentication, where the authentication technique has only two scores, corresponding to success or failure, are not used or not used by all authentication techniques to compute the authentication score.

DETAILED DESCRIPTION OF A PREFERRED EMBODIMENT

Figure 1:
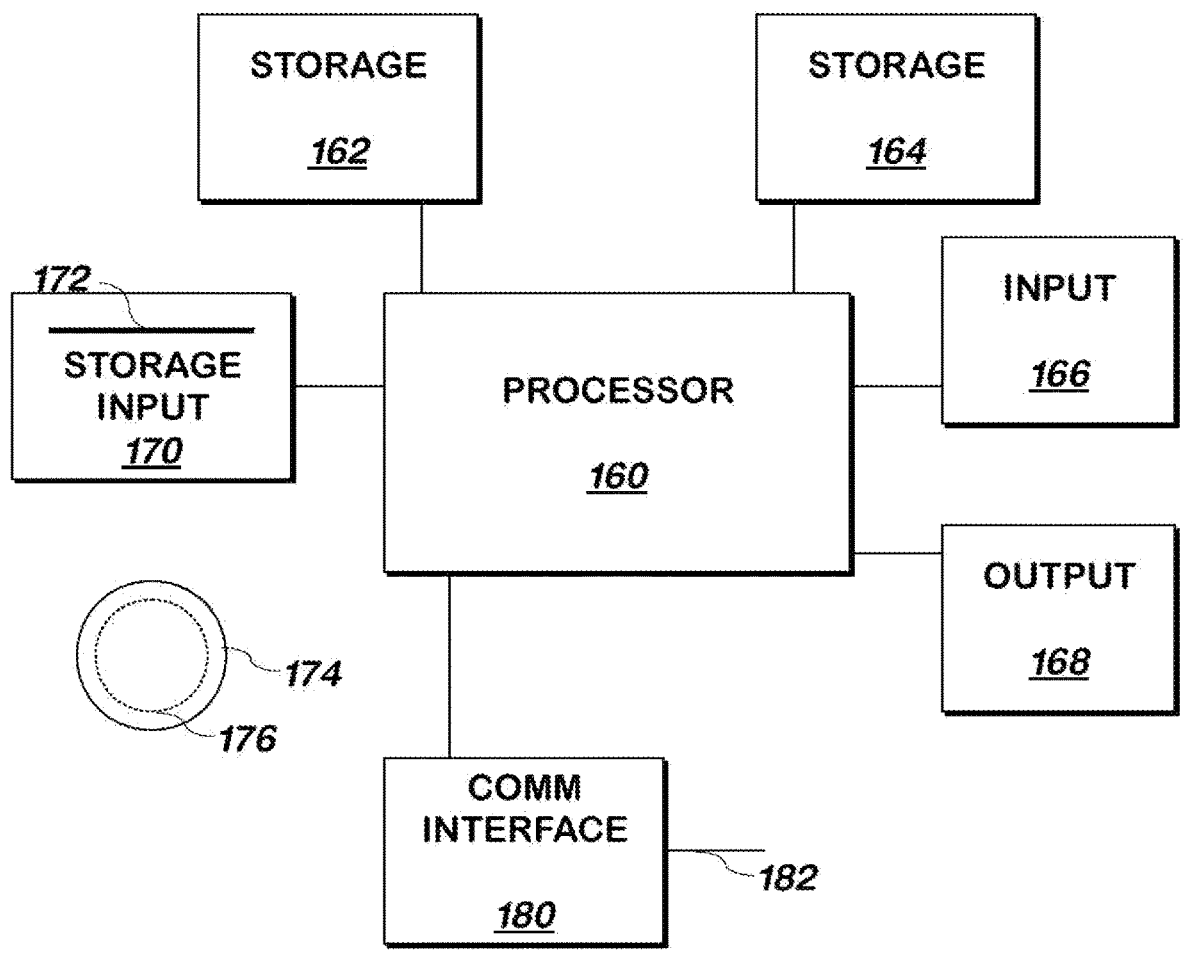
FIG. 1 is a block schematic diagram of a conventional computer system.

The present invention may be implemented as computer software running on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. System elements may include a conventional hardware computer processor, and one or more of each of any of an input, output or input/output. Only the word "means" is a nonce word, all other words are structural terms.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
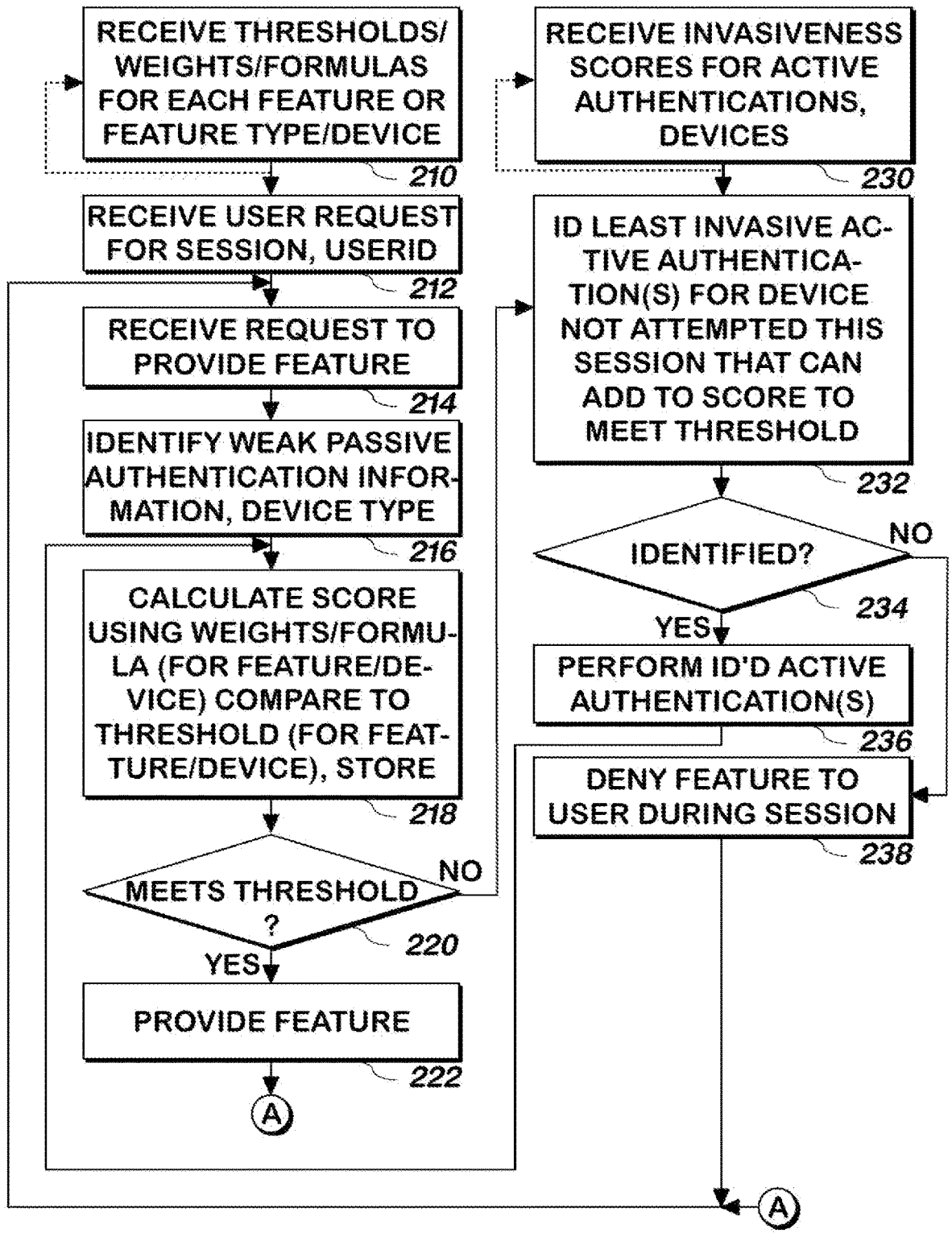
FIG. 2 is a flowchart illustrating a method of authenticating users for different features according to one embodiment of the present invention.

Referring now to FIG. 2, a method of providing features to a user after authenticating the user is shown according to one embodiment of the present invention. Any or all of thresholds, weights, or formulas for each feature or feature type is received, and if feature types are used, and assignment of each features to its feature type is received, and all such information is stored 210. In one embodiment, such information is received for each combination of feature and device type, or feature type and device type. In one embodiment, device types include smart mobile devices such as smart phones and tablets that can run a specialized application, mobile devices that can make calls and receive and send text messages, but cannot run a specialized application, laptops and desktop personal computers, and all other devices, though other device types may be used.

A user request for a session is received, and a user identifier may also be received 212. A request for a session may be received by navigating to a website, using an application, calling telephone number of a service that receives and/or provides information and/or allows a user specified action to take place, and other conventional methods of requesting a session. The user identifier may be received by the user actively providing it, or it may be received via passive methods such as retrieving from a conventional cookie or application secure storage on a mobile device.

A request to provide a feature is received 214. Features may include those which require low levels of authentication, such as providing publicly available information, those that require moderate levels of authentication, such as providing confidential information such as account balance, and those that require a higher level of authentication, such as those that allow users to make purchases or trades of securities within an account, and those that require the highest level of authentication, such as those that transfer money or other assets out of a user's account.

In response to the user requesting the feature, or at another time prior (such as in response to the user requesting the session as part of step 212), weak passive authentication information is identified, optionally along with the device type used to request the feature 216. In one embodiment, "weak" authentication information is anything other than memorized information such as a password, or anything other than a password and secure challenge and response information, such as could be provided via a security token, that is either separate from the phone or requires a password for its use. In one embodiment, weak authentication information is anything other than those items, and other similar information from other similar authentication techniques. "Strong" authentication information is anything that is not weak. As used herein, "passive" authentication information is authentication information that is collected without requiring that the user provide special information that is supplied primarily for the purpose of authentication. For example, passive authentication information could include retrieving a cookie or identifier of the user's device, such as an identifier retrieved from secure storage for an application, or produced via a conventional device fingerprinting techniques or identifying the user's IP address or device location. Identifying weak passive authentication information may include processing information, such an IP address, by comparing it to a database, to identify other information, such as a user's location, and comparing it to other information, such as a location of a device identified from a GPS or other location identification technique. In one embodiment, authentication information may be passive in some circumstances but not others. For example, the user's voice may not be considered to be passive authentication information if provided via a personal computer, or smart mobile device, but may be considered to be passive authentication information if provided via a mobile telephone that is not necessarily a smart phone with voice commands are used to operate the system that will provide the feature requested by the user. The device type may be identified using conventional device type identification techniques (e.g. checking the user agent header in JavaScript to distinguish between a desktop or mobile, as described at the MOZILLA organization web site on the page: /en-US/docs/Browser_detection_using_the_user_agent), or via the method used to initiate the session (an app assumed to be a mobile device).

An authentication score is calculated using the weights and/or formula for the feature requested, the authentication information received and the device type identified; the authentication score is compared to the threshold for the feature, and the authentication score is stored associated with the user identifier of the user and the current date and time, and optionally the unweighted component scores of the authentication score 218. Such component scores are calculated using the authentication information, with higher component scores indicating that the user is more likely the user identified than a lower score, or vice versa.

Other information that may be used to subsequently authenticate the user, such as the IP address of the user, and device signature or fingerprint, cookie or other identifier of the device the user uses to communicate may also be stored associated with the user identifier, and the current date and time as part of step 218.

The authentication score may be computed using one or more component scores. Each component score corresponds to a different authentication technique used to authenticate the user. In one embodiment, at least one component score is a non binary score, meaning that the component score has multiple degrees of indicating that the user has been authenticated, for example, scoring the user on a scale of 1 to 100, or 1 to 3. For example, a user who is using a computer system with the same characteristics of the processor, screen resolution and attached printer that was recently used to successfully authenticate the user may receive a score of 100 for the component score corresponding to that passive technique. If the processor characteristics and screen resolution is the same, but the printer is different, the component score may be 90. For each day between the current date and the date of prior authentication of the same IP address, the component score may be reduced by 1 point. Thus, a variety of score values may be received. Because the user may in fact be a different user who has broken into the user's home, the authentication technique is considered weak. Because the user does not have to take a specific action that is done solely to authenticate himself or herself using the technique, the authentication technique is considered passive.

There may be yet another component score that indicates whether the user has a cookie, or an identifier stored in secure storage, on the user's device, with a score of 100 if the cookie or other identifier was recently stored there, and a lower score if it was stored at an earlier time.

If the authentication score meets the threshold for the feature and device 220, the feature is provided 222 to the user, for example by providing information or allowing a transaction to occur, and the method continues at step 214. In one embodiment, step 222 includes storing and identification of the feature being provided, along with the user identifier of the user and the current date and time. If the authentication score does not meet the threshold for the feature and device 220, the method continues at step 232, where one or more active authentication techniques may be used to increase the user's authentication score above the threshold.

In one embodiment, an invasiveness score is received 230 for each of several active authentication techniques or combinations of active authentication techniques and types of devices. The invasiveness score is a measure of how inconvenient for the user being authenticated the active authentication technique is to perform, with a higher score indicating that the technique is more invasive, though a lower score can also so indicate. Active authentication techniques may include requesting and receiving a speech sample from which an authentication may be performed, or providing a challenge phrase in one communication band and receiving out of band response, such as by providing a text message containing a sequence of numbers that the user can enter into a web session. In one embodiment, an active authentication technique may include requesting and receiving a password of the user, however the invasiveness score of such active authentication may be higher than the invasiveness score of all other active authentications. In another embodiment, requesting and receiving a password is not considered to be an active authentication, or is used as a last resort in an attempt to authenticate the user if no other techniques that have not been used to the maximum allowable number of times can, or are expected to, increase the user's authentication score above the applicable threshold as described herein.

In one embodiment, for each active authentication or each combination of active authentications and types of devices, step 230 also includes receiving a threshold number of times such active authentication (optionally on that type of device) may be attempted, and the invasiveness score may be different for each such attempt, and such scores and threshold numbers of times are received as part of step 230. All such information of step 230 is stored associated with the session, and may be updated at any time as indicated by the dashed line in the figure.

At step 232, the least invasive active authentication or authentications for the device that has or have not already been attempted a threshold number of times during the current session and that can, or are expected to, add a sufficient amount to the user's authentication score is identified 232.

In one embodiment, a preference is used to identify the least number of active authentication techniques that can or are expected to provide a sufficient increase to the user's authentication score (when their component scores are weighted by the applicable weights or used in the applicable formula) to allow such authentication score to exceed the threshold for the feature requested using the device on which the request is made. Thus, if only one active authentication technique can, or is expected to provide, a sufficient contribution to the authentication score to meet or exceed the threshold, it will be preferred over multiple active authentication techniques that can or are expected to do so. In one embodiment, the expected increase in the authentication score from any active authentication technique is estimated, using the weights or formula assigned to such active authentication using such device and an average score of the user's recent prior attempts of authentication using such active authentication, optionally on the same type of device, or if insufficient information is available from which to compute such average (or in another embodiment, in all cases), the average of all users attempting such active authentication, optionally on the same type of device as the user, may be used to estimate the increase in the authentication score. The increase in the authentication score that can be attained is a maximum score (e.g. 100) for such technique or a percentage of such score (e.g. 90%). In one embodiment, an active authentication is any authentication technique in which the user is asked to perform a task that is requested in order to authenticate that user. Active authentications may include requesting the user to speak a phrase, receiving a generated set of characters via one communication band such as a text message, and typing, by the user, the received characters in any other communication band such as a web user interface. Some, all, or none of the active authentications may involve the user providing a password.

If such an active authentication is identified 234, the user is requested to use the identified active authentication to help authenticate that user and active authentication information is received from the user 236. If multiple active authentications were identified, the user is requested to use all such active authentications in order to help authenticate the user as part of step 236. Such authentication information is received from the user and used to authenticate the user using conventional techniques, for example, by generating an additional component score for each active authentication technique used, as part of step 236. The method continues at step 218, in which case the information (e.g. component scores) from the passive authentications and information from the active authentications will be used to generate the authentication score. If no such active authentications are identified subject to any constraints on the number of times they may be used as described herein 234, the feature requested by the user is denied to that user 238. The method continues at step 214. Following step 222, the method continues at step 214.

Any number of different users may be authenticated as described herein, with different component and authentication scores expected from one user to the next and from one session of a user to the next session, on the same or different device at different sessions, of the same user, as any user may be authenticated for any number of features requested at any number of sessions.

Some of the authentication techniques described herein are described as being compared to information previously stored when the user was authenticated to the same level as is required. However, in other embodiments, the most recent successful prior information may be used for any prior threshold of successful authentication, even if the prior authentication threshold was lower than is being used at the time.

System.

The components of the system shown in the Figures each has an input, output, or input/output as described, and each component may have any number of such inputs, outputs, or input/outputs. Each element operates as described herein and above.

Figure 3:
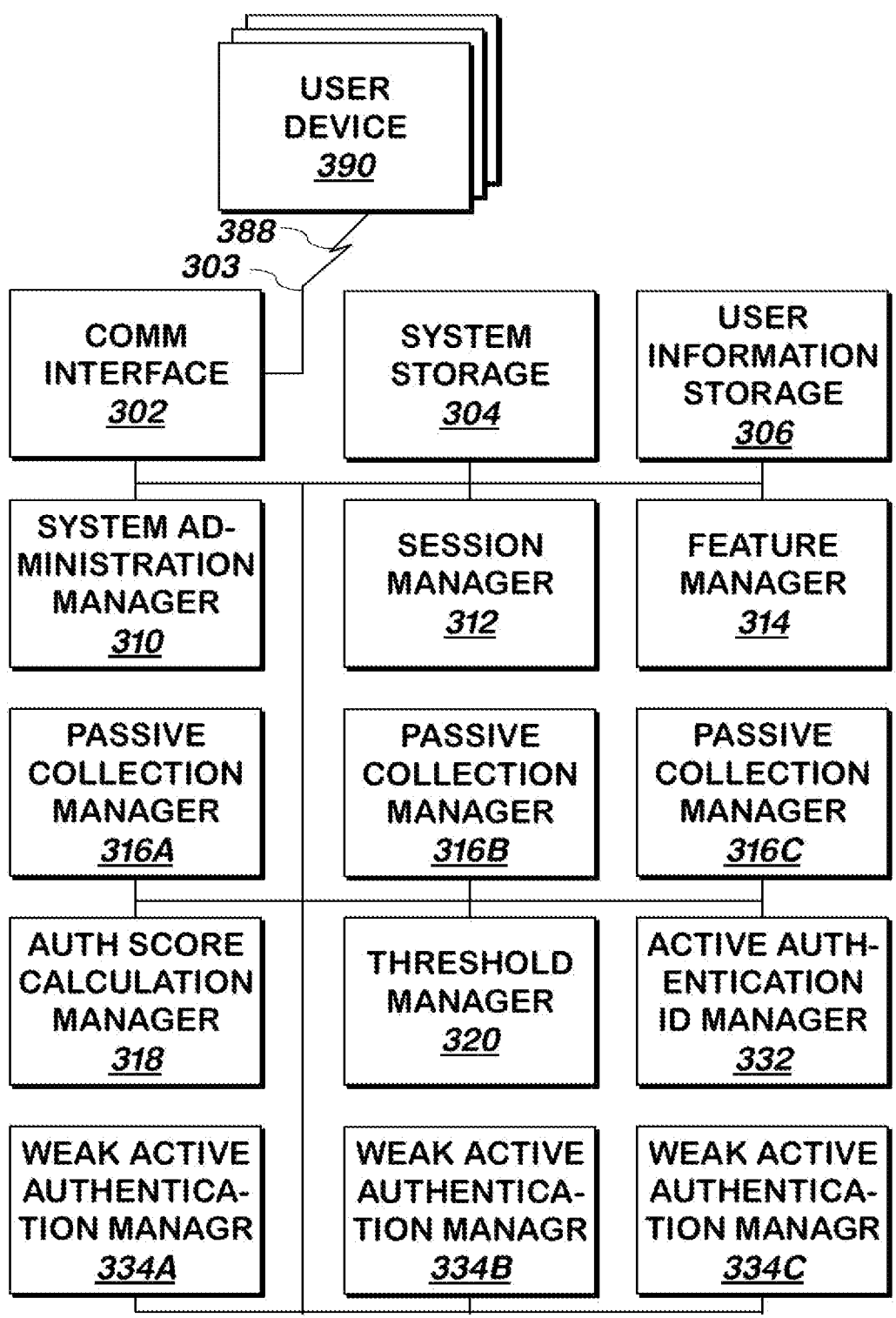
FIG. 3 is a block schematic diagram of a system for authenticating users for different features according to one embodiment of the present invention.

Referring now to FIG. 3, a system for authenticating users based on weak authentication information, using different authentication requirements for different features, is shown according to one embodiment of the present invention. System administration manager 310 receives the threshold, weights, and/or formulas for each feature or feature type, and optionally device type (in which case, it also receives the device type or types to which each threshold, weight or formula corresponds), and optionally, a map of identifiers of each of the features to the feature types, and/or any of the above for all features as described above and stores them into system storage 304. Such information may be updated at any time, and updates are received and stored by system administration manager 310 into system storage 304.

Session manager 312 receives via network 388 requests for sessions from a user using user device 390, and optionally identifies the device type of user device 390, based in whole or in part on the manner in which the request is received, and/or using other conventional device type identification techniques. For example, if session manager 312 receives a request for a session via a telephone connection, session manager 312 identifies the device type as a telephone, even though the user may be using a smartphone. If session manager 312 receives a request for a session via a conventional webpage request, session manager 312 identifies the device type as a desktop or laptop, or may identify the device as a smartphone. Other conventional techniques for distinguishing among devices may be used, such as the checking the user agent header in JavaScript to distinguish between a desktop or mobile, as described at the MOZILLA organization web site on the page: /en-US/docs/Browser_detection_using_the_user_agent. In one embodiment, session manager 312 compares the source IP address from requesting device to a database of IP addresses that are generated for mobile devices, and identifies the device type as a smart phone or other mobile device if the source IP address matches one of those in the database, and otherwise identifies the device type as a desktop or laptop computer system. Session manager 312 may receive the request for a session via an address and port that is used by a conventional smart device (e.g. smart phone, tablet or smart watch) application, in which case session manager 312 identifies the device type as a smart phone or other mobile device. Session manager 312 issues a session identifier that is unique to the session and stores the session identifier, with the device type and the date and time into user information storage 306. Session manager 312 may receive an identifier of the user, either user supplied in response to session manager 312 requesting it, or by passively identifying it, for example via a cookie or by using the phone number or other similar identifier of the user based on a recent contact. For example, if the user last called or usually calls from a phone number used by no other user, the user may be identified as that user. (The user may be identified as one of several users using that phone number, and then the specific one of those users is authenticated as the user having the only score of such users that is above the threshold as described herein, or if the user cannot be identified or is ambiguous before or after any such authentication is attempted, the user may be requested for their user identifier).

Session manager 312 transfers control of the session to feature manager 314, and provides to feature manager 314 the identifier of the session generated.

When it receives control of the session, and the session identifier, feature manager 314 provides a user-interface that allows the user to request one or more features, and feature manager 314 signals weak passive authentication information managers 316A, 316B and 316C with the session identifier it receives. Although three weak passive authentication information managers 316 are shown, other numbers, higher or lower than three, of weak passive authentication information managers 316 may be used.

When signaled, each weak passive authentication information manager 316 retrieves the authentication information it uses, either from the user device 390, user information storage 306, system storage 304, or any or all of these as described herein. Pertinent database information may be stored in system storage 304, such as those referenced above, and may include a database of IP addresses and approximate locations, and a database of IP addresses and mobile service providers that indicate that a web request is coming from a smart phone or tablet or other wireless network-connected device. Information retrieved from the user device 390 may include its IP address as reported by the user device 390, device fingerprint information, such as identifiers of system components and their state, location information, such as conventional GPS location information, and other conventional information that may be retrieved from the user device 390. Information retrieved from the user device 390 may include voice information the user provides to the user device 390, which the user device 390 forwards to the system of FIG. 3. Information in user information storage 306 may include any or all of: information about the device that had been retrieved at a prior time and stored as described herein, one or more component scores stored at a prior time, and an authentication score stored at a prior time. Each weak passive authentication information manager 316A, 316B, and 316C identifies (and optionally updates) a component score as described above and stores the component score, the date and time, and the session identifier into user information storage 306 (optionally at each update). In one embodiment, one such weak passive authentication information manager 316 compares the voice information received from the user to voice information previously stored for the user in user information storage 306 at a time that the user had been previously authenticated to a threshold level of confidence or using strong active authentication, and stores received voice information into user information 306.

In one embodiment, one or more of the weak passive authentication information managers 316A, 316B, or 316C may retrieve or receive a user identifier of the user. The user identifier may be retrieved via a cookie or secure storage on the user device 390. The user identifier may be explicitly provided by the user to one or more of the weak passive authentication information managers 316A, 316B, or 316C such as by speaking it or by typing it.

At any time, the user may request a feature from feature manager 314 via conventional techniques. If feature types are used, feature manager 314 identifies the feature type from the feature using the map of feature types and features stored in system storage 304. Feature manager 314 stores an identifier of the feature or the feature type with the session identifier and the date and time in user information storage 306, and provides the session identifier to authentication score calculator 318, along with the session identifier.

When it receives the session identifier, authentication score calculator 318 retrieves the identifier of the feature or feature type requested, and the appropriate weights, formula, and/or threshold corresponding to the feature from system storage 304. If such information also corresponds to the device type, authentication score calculator 318 retrieves the device type from user information storage 306 and uses it to identify the appropriate weights, formula, and/or threshold. Each weight corresponds to a component score, and if weights are used, authentication score calculator 318 multiplies the weight by any component scores that are stored in user information storage 306 for the current session and sums the results to produce the authentication score. If formulas are used, authentication score calculator 318 applies the component scores for the session stored in user information storage 306 to the appropriate formula for the feature or feature type, and optionally the device, to produce the authentication score. Authentication score calculator 318 stores the authentication score, the applicable weights or formula, the current date and time retrieved from the system clock (not shown) and the session identifier into user information storage 306 and provides the authentication score, the session identifier, and the identifier of the feature or the feature type to threshold manager 320.

When it receives such information, threshold manager 320 retrieves the appropriate threshold, optionally for the device type and optionally the device type from system storage 304. Threshold manager 320 stores the threshold it identifies into user information storage 306 along with the session identifier and the current date and time it retrieves from a system clock (not shown) and compares the authentication score it received with the threshold it retrieves or threshold for the device it identifies from among those retrieved using the device type, and provides an indication to feature manager 314 whether the authentication score exceeded the threshold. If indication indicates that the authentication score exceeded the threshold, feature manager 314 initiates providing the feature requested by the user, using conventional techniques. Otherwise, feature manager 314 provides the session identifier to active authentication identification manager 332 which uses it to retrieve the authentication score, the applicable formula or weights, and the threshold from user information storage 306, identify the difference, and then uses the difference and the formula or weights to identify the least invasive active authentication that can lead to a score at or above the threshold, as described above with respect to step 230 of FIG. 2. The statistics and limits for such identification described above are stored in system storage 304 and/or user information storage 306 and active authentication identification manager 332 uses such information, along with the number of times an active authentication has been performed for the session (stored in user information storage 306) and the formula or weights and thresholds most recently identified for the session in user information storage 306 in making the identification. Active authentication identification manager 332 stores the identified active authentication, associated with the session identifier and the current date and time retrieved from a system clock (not shown) into user information storage 306. Based on the active authentication identified, active authentication identification manager 332 looks up the corresponding active authentication manager 334A, 334B, or 334C that performs the active authentication it identifies using a table in system storage 304 and provides the session identifier to that active authentication manager 334A, 334B, or 334C, each of which performs a different active authentication technique, which may all be weak or may be a weak active authentication technique or a strong active authentication technique, such as asking for a password. One, some or all of the active authentication managers 334A-C may be used at each or all iterations described herein. If there are no active permissible active authentications that can be expected to cause the authentication score to meet or exceed the threshold, active authentication identification manager 332 so indicates to feature manager 314, which denies providing the feature to the user and may optionally inform the user that the feature is denied. In one embodiment, feature manager 314 provides the feature or denies providing the feature by providing a signal to a different element (not shown).

The active authentication manager 334A, 334B, or 334C receives such information, asks the user to perform the technique, receives a response from the user via user device 390 applies a score to the response as described herein, and stores into user information storage 306 associated with the session identifier, the score and the current date and time it retrieves from a system clock (not shown). The active authentication manager 334A, 334B, or 334C signals authentication score calculator 318 with the session identifier, which repeats the process described above, including the newly identified active authentication score (and any prior ones associated with the session) in the authentication score by incorporating it in the formula or multiplying by the weight.

When incorporating multiple scores of a single active or passive authentication technique, any conventional method may be used, including taking the most recent of the scores and ignoring the rest, taking the highest score or lowest score and ignoring the rest, averaging the scores, using a weighted average or median, or any other technique.

The statistics for the user or for all users may be identified by reviewing historical scores from that user or for all users stored in user information storage 306, and averaging, taking a median, taking the highest the $90^{th}$ percentile, or 90% of the highest N scores, with any of these optionally ignoring the highest N percent and/or lowest M percent of the pertinent scores.

Any number of user devices may be used, with different types being used at any time. One user who requests one feature may have an authentication score that allows the feature to be provided, but does not have an authentication score that allows a different feature to be provided, that is requested by the same user at a different time. A user with a score that is sufficient to allow a feature to be provided as described herein on one device, may have the same score on a different device, but that score may not be sufficient to allow the same feature to be provided on a different device as described herein. A user who performs the same actions on one device that generates a score high enough to allow a feature to be provided may perform the exact same actions on a different device and receive a different score, but one that does not allow the same feature to be provided, even if the score on the different device is higher than the score on the first device. Different users may have different scores. The same threshold, formula or weights may be used for different users or different users on the same device or type of device (who are using different devices). Any combination of these may also be in effect.

Summary.

Described is a method of providing a feature to a user, including: receiving, for each combination of: A) two or more of feature or feature types and B) two or more of devices or device types, at least one selected from a set including at least one formula, at least one set of weights and at least one threshold; receiving from a user a request to provide a feature by a user using a device; collecting weak passive authentication information from the user device and/or the user; computing a component score for each of two or more of weak authentication techniques, responsive to the weak passive authentication information; selecting at least one of the at least one set of weights, at least one formula and at least one threshold responsive to at least one of: A) a type of the device, B) the device, C) the feature requested and D) a feature type that includes the feature requested; comparing a combination of the plurality of component scores to a threshold, wherein at least one of: A) the combination is responsive to the formula and/or the set of weights selected, and B) the threshold is the threshold selected; responsive to the comparing indicating the user is authentic, providing the feature.

The method optionally additionally includes: responsive to the comparing not indicating the user is authentic, requesting and receiving active authentication information from the user; computing an additional component score for each of at least one active authentication technique that is responsive to the active authentication information; comparing a combination of the plurality of component scores and the at least one additional component score to a threshold, wherein at least one of: A) the combination is responsive to the formula and/or the set of weights selected, and B) the threshold is the threshold selected; responsive to a most recent said comparing indicating the user is authentic, providing the feature.

The method optionally additionally includes, prior to the requesting and receiving step, selecting at least one of the at least one active authentication technique responsive to a most recent combination and the threshold used in a most recent comparing.

The method optionally additionally includes assigning an inconvenience score to each of the at least one active authentication technique that is based upon a perceived level of inconvenience to the user of supplying the active authentication information used to perform said active authentication technique; and wherein at least one of the at least one authentication technique selected is selected responsive to the inconvenience score assigned to said at least one active authentication technique.

The method includes an optional feature whereby the active authentication information does not comprise a password.

The method includes an optional feature whereby all of the at least one active authentication technique does not have a binary outcome including success or failure.

Described is a system of providing a feature to a user, including: a system administration manager having an input for receiving, for each combination of: A) two or more of feature or feature types and B) two or more of devices or device types, at least one selected from a set including at least one formula, at least one set of weights and at least one threshold, the system administration manager for providing at an output the at least one selected from the set including at least one formula, at least one set of weights and at least one threshold, for each combination of the plurality of features or feature types, and the plurality of device or device types; a session manager having an input for identifying the device and/or device type of the device of a user, the session manager for providing at an output an identifier of the device and/or device type of the device of the user; a feature manager having an input for receiving from the user a request to provide a feature by the user using the device, the feature manager for providing at an output an identifier of the feature or feature type of the feature requested; at least one passive collection manager having an input for receiving weak passive authentication information from the user device and/or the user, each of the at least one passive collection manager for computing and providing at an output a component score responsive to the weak passive authentication information and at least one weak authentication technique different from any other of the at least one passive collection manager; and an authentication score calculation manager having an input coupled to the system administration manager output for receiving the at least one selected from the set including at least one formula, at least one set of weights and at least one threshold, for each combination of the plurality of features or feature types, and the plurality of device or device types, to the session manager output for receiving the identifier of the device and/or device type of the device of the user, to the feature manager output for receiving the identifier of the feature or feature type of the feature requested, and to each of the at least one passive collection manager output for receiving the at least one component score, the authentication score calculation manager for selecting at least one of the at least one set of weights, at least one formula and at least one threshold responsive to at least one of: A) a type of the device, B) the device, C) the feature requested and D) a feature type of the feature requested, for comparing a combination of the at least one component score to a threshold, wherein at least one of: A) the combination is responsive to the formula and/or the set of weights selected, and B) the threshold is the threshold selected and for providing at an output an indication indicating whether the user is authentic responsive to said comparing; and wherein the feature manager input is additionally coupled to the authentication score calculation manager output for receiving the indication, and the feature manager is additionally for providing at the feature manager output the feature, responsive to the indication indicating that the user is authentic.

The system includes an optional feature whereby, the feature manager is additionally for providing at the feature manager output a signal, responsive to the indication indicating that the user is not authentic; and additionally including at least one active authentication manager having an input coupled to the feature manager output for receiving the signal or an additional signal, each active authentication manager for, responsive to the signal or the additional signal, requesting and receiving active authentication information from the user via an input/output and computing and providing at an output an additional component score for each of at least one active authentication technique that is responsive to the active authentication information it receives; and wherein: the authentication score calculation manager input is additionally coupled to the at least one active authentication manager output for receiving the at least one additional component score, the authentication score calculation manager for, for comparing a combination of the at least one component score and at least one additional component score to the threshold, wherein at least one of: A) the combination is responsive to the formula and/or the set of weights selected, and B) the threshold is the threshold selected and for providing at an output an additional indication indicating whether the user is authentic responsive to said comparing; and the feature manager input is additionally for receiving the additional indication and the feature manager is additionally for, responsive to the additional indication indicating the user is authentic, providing the feature via the feature manager output.

The system includes an optional feature whereby: the signal comprises least one number responsive to the combination and the threshold; and the at least one active authentication manager input is coupled to an active authentication identification manager output for receiving the additional signal; and additionally including the active authentication identification manager having an input coupled to the feature manager output for receiving the at least one number responsive to the combination and the threshold, the active authentication identification manager for selecting and providing the additional signal to at least one, but less than all, of the at least one active authentication manager, responsive to the at least one number responsive to the combination and the threshold.

The system includes an optional feature whereby the active authentication identification manager assigns an inconvenience score to each of the at least one active authentication manager, that is based upon a perceived level of inconvenience to the user of supplying the active authentication information requested by said active authentication manager; and wherein the active authentication identification manager provides the additional indication responsive to the inconvenience score assigned to said at least one active authentication manager.

The system includes an optional feature whereby the active authentication information does not comprise a password.

The system includes an optional feature whereby all of the at least one active authentication technique does not have a binary outcome including success or failure.

Described is a computer program product including a computer useable medium having computer readable program code embodied therein for providing a feature to a user, the computer program product including computer readable program code devices configured to cause a computer system to: receive, for each combination of: A) two or more of feature or feature types and B) two or more of devices or device types, at least one selected from a set including at least one formula, at least one set of weights and at least one threshold; receive from a user a request to provide a feature by a user using a device; collect weak passive authentication information from the user device and/or the user; compute a component score for each of two or more of weak authentication techniques, responsive to the weak passive authentication information; select at least one of the at least one set of weights, at least one formula and at least one threshold responsive to at least one of: A) a type of the device, B) the device, C) the feature requested and D) a feature type that includes the feature requested; compare a combination of the plurality of component scores to a threshold, wherein at least one of: A) the combination is responsive to the formula and/or the set of weights selected, and B) the threshold is the threshold selected; responsive to the comparing indicating the user is authentic, provide the feature.

The computer program product optionally additionally includes computer readable program code devices configured to cause the computer system to: responsive to the comparing not indicating the user is authentic, request and receive active authentication information from the user; compute an additional component score for each of at least one active authentication technique that is responsive to the active authentication information; compare a combination of the plurality of component scores and the at least one additional component score to a threshold, wherein at least one of: A) the combination is responsive to the formula and/or the set of weights selected, and B) the threshold is the threshold selected; responsive to a most recent said comparing indicating the user is authentic, provide the feature.

The computer program product optionally additionally includes, computer readable program code devices configured to cause the computer system to, prior to operation of the computer readable program code devices configured to cause the computer system to request and receive, select at least one of the at least one active authentication technique responsive to a most recent combination and the threshold used in a most recent comparing.

The computer program product optionally additionally includes computer readable program code devices configured to cause the computer system to assign an inconvenience score to each of the at least one active authentication technique that is based upon a perceived level of inconvenience to the user of supplying the active authentication information used to perform said active authentication technique; and wherein at least one of the at least one authentication technique selected is selected responsive to the inconvenience score assigned to said at least one active authentication technique.

The computer program product includes an optional feature whereby the active authentication information does not comprise a password.

The computer program includes an optional feature whereby all of the at least one active authentication technique does not have a binary outcome comprising success or failure.

What is claimed is:

1. A computer-implemented method of providing a feature to a user, comprising:
   receiving, for each of a plurality of different combinations of: A) at least one of a plurality of features or feature types and B) at least one of a plurality of devices or device types, a different at least one selected from a set comprising at least one formula, at least one set of weights and at least one threshold;
   receiving from the user a request to provide the feature by the user using a device;
   collecting passive authentication information from the user device and/or the user;
   computing, by a hardware computer processor coupled to a computer memory, a component score for each of a plurality of authentication techniques, responsive to the passive authentication information;
   selecting at least one of the at least one set of weights, at least one formula and at least one threshold responsive to, for any given feature, at least one of: A) a type of the device, and B) the device;
   comparing a combination of the plurality of component scores to a threshold, wherein at least one of: A) the combination is responsive to the formula and/or the set of weights selected, and B) the threshold is the threshold selected;
   responsive to the comparing indicating the user is authentic, providing the feature; and
   responsive to the comparing not indicating the user is authentic, requesting and receiving active authentication information from the user, wherein the active authentication information does not comprise a password.

2. The method of claim 1, additionally comprising:
   computing an additional component score for each of at least one active authentication technique that is responsive to the active authentication information;
   comparing a combination of the plurality of component scores and the at least one additional component score to a threshold, wherein at least one of: A) the combination is responsive to the formula and/or the set of weights selected, and B) the threshold is the threshold selected;
   responsive to a most recent said comparing indicating the user is authentic, providing the feature.

3. The method of claim 2, additionally comprising, prior to the requesting and receiving step, selecting at least one of the at least one active authentication technique responsive to a most recent combination and the threshold used in a most recent comparing.

4. The method of claim 3:
   additionally comprising assigning an inconvenience score to each of the at least one active authentication technique that is based upon a perceived level of inconvenience to the user of supplying the active authentication information used to perform said active authentication technique; and
   wherein at least one of the at least one authentication technique selected is selected responsive to the inconvenience score assigned to said at least one active authentication technique.

5. The method of claim 2 wherein all of the at least one active authentication technique does not have a binary outcome comprising success or failure.

6. A system for providing a feature to a user, comprising:
   a system administration manager having an input for receiving, for each of a plurality of different combinations of: A) at least one of a plurality of features or feature types and B) at least one of a plurality of devices or device types, a different at least one selected from a set comprising at least one formula, at least one set of weights and at least one threshold, the system administration manager for providing at an output the at least one selected from the set comprising at least one formula, at least one set of weights and at least one threshold, for each combination of the plurality of features or feature types, and the plurality of device or device types;
   a session manager having an input for identifying the device and/or device type of the device of a user, the session manager for providing at an output an identifier of the device and/or device type of the device of the user;
   a feature manager having an input for receiving from the user a request to provide the feature by the user using the device of the user, the feature manager for providing at an output an identifier of the feature or feature type of the feature requested, and for providing at the feature manager output a signal, responsive to the indication indicating that the user is not authentic;
   at least one active authentication manager having an input coupled to the feature manager output for receiving the signal or an additional signal, each active authentication manager for, responsive to the signal or the additional signal, requesting and receiving active authentication information, not comprising a password, from the user via an input/output and computing and providing at an output an additional component score for each of at least one active authentication technique that is responsive to the active authentication information it receives;

at least one passive collection manager having an input for receiving passive authentication information from the user device and/or the user, each of the at least one passive collection manager for computing and providing at an output a component score responsive to the passive authentication information and at least one authentication technique different from any other of the at least one passive collection manager; and an authentication score calculation manager comprising a processor coupled to a memory and having an input coupled to the system administration manager output for receiving the at least one selected from the set comprising at least one formula, at least one set of weights and at least one threshold, for each combination of the plurality of features or feature types, and the plurality of device or device types, to the session manager output for receiving the identifier of the device and/or device type of the device of the user, to the feature manager output for receiving the identifier of the feature or feature type of the feature requested, and to each of the at least one passive collection manager output for receiving the at least one component score, the authentication score calculation manager for selecting at least one of the at least one set of weights, at least one formula and at least one threshold responsive to, for any given feature, at least one of: A) a type of the device of the user, and B) the device of the user, for comparing a combination of the at least one component score to a threshold, wherein at least one of: A) the combination is responsive to the formula and/or the set of weights selected, and B) the threshold is the threshold selected and for providing at an output an indication indicating whether the user is authentic responsive to said comparing; and wherein the feature manager input is additionally coupled to the authentication score calculation manager output for receiving the indication, and the feature manager is additionally for providing at the feature manager output the feature, responsive to the indication indicating that the user is authentic.

7. The system of claim 6, wherein:

the authentication score calculation manager input is additionally coupled to the at least one active authentication manager output for receiving the at least one additional component score, the authentication score calculation manager for, for comparing a combination of the at least one component score and at least one additional component score to the threshold, wherein at least one of: A) the combination is responsive to the formula and/or the set of weights selected, and B) the threshold is the threshold selected, and for providing at an output an additional indication indicating whether the user is authentic responsive to said comparing; and the feature manager input is additionally for receiving the additional indication and the feature manager is additionally for, responsive to the additional indication indicating the user is authentic, providing the feature via the feature manager output.

8. The system of claim 7:
wherein:
the signal comprises at least one number responsive to the combination and the threshold; and the at least one active authentication manager input is coupled to an active authentication identification manager output for receiving the additional signal; and additionally comprising the active authentication identification manager having an input coupled to the feature manager output for receiving the at least one number responsive to the combination and the threshold, the active authentication identification manager for selecting and providing the additional signal to at least one, but less than all, of the at least one active authentication manager, responsive to the at least one number responsive to the combination and the threshold.

9. The system of claim 8:
wherein the active authentication identification manager assigns an inconvenience score to each of the at least one active authentication manager, that is based upon a perceived level of inconvenience to the user of supplying the active authentication information requested by said active authentication manager; and
wherein the active authentication identification manager provides the additional indication responsive to the inconvenience score assigned to said at least one active authentication manager.

10. The system of claim 7 wherein all of the at least one active authentication technique does not have a binary outcome comprising success or failure.

11. A computer program product comprising a nontransitory computer useable storage medium having computer readable program code embodied therein for providing a feature to a user, the computer program product comprising computer readable program code devices configured to cause a computer system to:

receive, for each of a plurality of different combinations of: A) at least one of a plurality of features or feature types and B) at least one of a plurality of devices or device types, a different at least one selected from a set comprising at least one formula, at least one set of weights and at least one threshold;

receive from the user a request to provide the feature by the user using a device;

collect passive authentication information from the user device and/or the user;

compute a component score for each of a plurality of authentication techniques, responsive to the passive authentication information;

select at least one of the at least one set of weights, at least one formula and at least one threshold responsive to, for any given feature, at least one of: A) a type of the device, and B) the device;

compare a combination of the plurality of component scores to a threshold, wherein at least one of: A) the combination is responsive to the formula and/or the set of weights selected, and B) the threshold is the threshold selected;

responsive to the comparing indicating the user is authentic, provide the feature; and responsive to the comparing not indicating the user is authentic, request and receive active authentication information from the user, wherein the active authentication information does not comprise a password.

12. The computer program product of claim 11, additionally comprising computer readable program code devices configured to cause the computer system to:

compute an additional component score for each of at least one active authentication technique that is responsive to the active authentication information;

compare a combination of the plurality of component scores and the at least one additional component score to a threshold, wherein at least one of: A) the combination is responsive to the formula and/or the set of weights selected, and B) the threshold is the threshold selected;

responsive to a most recent said comparing indicating the user is authentic, provide the feature.

13. The computer program product of claim 12, additionally comprising, computer readable program code devices configured to cause the computer system to, prior to operation of the computer readable program code devices configured to cause the computer system to request and receive, select at least one of the at least one active authentication technique responsive to a most recent combination and the threshold used in a most recent comparing.

14. The computer program product of claim 13:

additionally comprising computer readable program code devices configured to cause the computer system to assign an inconvenience score to each of the at least one active authentication technique that is based upon a perceived level of inconvenience to the user of supplying the active authentication information used to perform said active authentication technique; and wherein at least one of the at least one authentication technique selected is selected responsive to the inconvenience score assigned to said at least one active authentication technique.

15. The computer program product of claim 12 wherein all of the at least one active authentication technique does not have a binary outcome comprising success or failure.

\* \* \* \* \*